United States Patent
Tamai

(10) Patent No.: US 10,636,132 B2
(45) Date of Patent: Apr. 28, 2020

(54) IMAGE PROCESSING SYSTEM, INFORMATION PROCESSING DEVICE, INFORMATION PROCESSING METHOD, AND INFORMATION PROCESSING PROGRAM

(71) Applicant: OMRON Corporation, Kyoto-shi, Kyoto (JP)

(72) Inventor: Toshinori Tamai, Nara (JP)

(73) Assignee: OMRON Corporation, Kyoto-shi (JP)

( * ) Notice: Subject to any disclaimer, the term of this patent is extended or adjusted under 35 U.S.C. 154(b) by 210 days.

(21) Appl. No.: 15/786,717

(22) Filed: Oct. 18, 2017

(65) Prior Publication Data

US 2018/0218491 A1 Aug. 2, 2018

(30) Foreign Application Priority Data

Jan. 30, 2017 (JP) .................... 2017-013908

(51) Int. Cl.
*G06T 7/00* (2017.01)
*G06K 9/00* (2006.01)
(Continued)

(52) U.S. Cl.
CPC ........ *G06T 7/0004* (2013.01); *G06K 9/00986* (2013.01); *G06K 9/00993* (2013.01);
(Continued)

(58) Field of Classification Search
CPC .............. G06F 3/0482; G06F 3/04842; G06F 2212/1041; G06K 9/00993;
(Continued)

(56) References Cited

U.S. PATENT DOCUMENTS 6,219,129 B1 * 4/2001 Kinjo ................. H04N 1/00267
355/40
7,367,017 B2 * 4/2008 Maddocks .............. G06F 9/451
717/115
(Continued)

FOREIGN PATENT DOCUMENTS

JP 2013-080407 * 2/2013
JP 2014-203309 A 10/2014

*Primary Examiner* — Shaghayegh Azima
(74) *Attorney, Agent, or Firm* — Metrolex IP Law Group, PLLC

(57) ABSTRACT

An image processing system includes: a central processing unit (CPU); a field programmable gate array (FPGA); a storage in which a library including plural pieces of image processing executed by the CPU or the FPGA is stored; an operation unit configured to receive an operation to select at least one piece of image processing from the library and an operation to designate execution order with respect to each piece of selection target image processing selected through the selection operation; an estimator configured to estimate an execution time in each combination of execution subjects with respect to each piece of selection target image processing when the CPU or the FPGA processes each piece of selection target image processing according to the execution order; a specification unit configured to specify the combination of the execution subjects having the relatively short execution time; and a display configured to display the specified.

13 Claims, 13 Drawing Sheets

(51) Int. Cl.
*G06T 1/20* (2006.01)
*G06F 3/0481* (2013.01)
*G06F 3/0484* (2013.01)
*G06F 8/34* (2018.01)

(52) U.S. Cl.
CPC ............ *G06T 1/20* (2013.01); *G06F 3/04817* (2013.01); *G06F 3/04842* (2013.01); *G06F 3/04845* (2013.01); *G06F 8/34* (2013.01)

(58) Field of Classification Search
CPC ........... G06K 2209/01; G06K 2209/19; G06K 2209/21; G06K 9/00973; G06K 9/2081; G06K 9/6253
See application file for complete search history.

(56) References Cited

U.S. PATENT DOCUMENTS

| | | | | |
|---|---|---|---|---|
| 7,421,109 | B2* | 9/2008 | Tsuchiya | G06T 7/0004 348/130 |
| 8,036,447 | B2* | 10/2011 | Hayakawa | G06T 7/001 382/141 |
| 9,697,579 | B2* | 7/2017 | Taggart | G06T 15/005 |
| 2005/0219578 | A1* | 10/2005 | Hiraoka | H04N 1/00931 358/1.9 |
| 2010/0106949 | A1* | 4/2010 | Komatsu | G06F 8/45 712/226 |
| 2010/0123930 | A1* | 5/2010 | Tomizawa | G06Q 30/06 358/1.15 |
| 2011/0222789 | A1* | 9/2011 | Aizawa | G06K 9/4604 382/229 |
| 2012/0042323 | A1* | 2/2012 | Sekiguchi | G06F 9/5072 718/106 |
| 2012/0148267 | A1* | 6/2012 | Kawai | G03G 15/5079 399/8 |
| 2013/0066616 | A1* | 3/2013 | Shimakawa | G05B 19/4068 703/7 |
| 2014/0218763 | A1* | 8/2014 | Takahashi | H04N 1/00307 358/1.15 |
| 2014/0304637 | A1* | 10/2014 | Ijiri | G06F 3/04842 715/771 |
| 2015/0277874 | A1* | 10/2015 | Haraguchi | G06F 8/443 717/160 |
| 2016/0012577 | A1* | 1/2016 | Oka | G05B 19/41875 382/152 |
| 2018/0046346 | A1* | 2/2018 | Choi | G06F 3/0414 |

\* cited by examiner

IMAGE PROCESSING SYSTEM, INFORMATION PROCESSING DEVICE, INFORMATION PROCESSING METHOD, AND INFORMATION PROCESSING PROGRAM

CROSS-REFERENCE TO RELATED APPLICATION

This application is based on Japanese Patent Application No. 2017-013908 filed with the Japan Patent Office on Jan. 30, 2017, the entire contents of which are incorporated herein by reference.

FIELD

The present disclosure relates to a technology of optimizing image processing execution subjects combined by a user.

BACKGROUND

A technology of automatically inspecting a workpiece becomes widespread in a factory automation (FA) field. The work inspection processing is performed by a combination of various pieces of image processing. An application that provides a user interface setting the combination of the pieces of image processing by the user per se has been developed.

As to the application, Japanese Patent Application Laid-open No. 2014-203309 discloses an image processing device that "can perform more efficient and high-speed image processing using knowledge about specific application image processing owned by a user". In Japanese Patent Application Laid-open No. 2014-203309, the user selects a desired processing item from plural processing items in which different pieces of image processing are defined, and arranges the processing items side by side on the user interface, and each processing item is executed in execution order corresponding to an alignment sequence. The user can perform arbitrary inspection processing by changing the combination of processing items. Hereinafter, a series of image processing groups performed by the processing items combined by the user is also referred to as "a user setting processing flow".

SUMMARY

The user setting processing flow is executed by an image processing device such as an image sensor. Some image processing devices include plural types of control devices such as a central processing unit (CPU) and a field programmable gate array (FPGA). The pieces of image processing included in the user setting processing flow are cooperatively executed by the plural types of control devices, thereby performing high-speed processing. At this point, the optimum execution subject of each piece of image processing varies depending on various factors such as a combination of the pieces of image processing and the execution order of the image processing. Therefore, there is a demand for a technology of specifying the optimum execution subject with respect to each piece of image processing in the user setting processing flow.

According to one aspect, an image processing system includes: a first control device; a second control device having a type different from the first control device; a storage in which a library including plural pieces of image processing executed by the first control device or the second control device is stored; an operation unit configured to receive an operation to select at least one piece of image processing from the library and an operation to designate execution order with respect to each piece of selection target image processing selected through the selection operation; an estimator configured to estimate an execution time in each combination of execution subjects with respect to each piece of selection target image processing when the first control device or the second control device processes each piece of selection target image processing according to the execution order; a specification unit configured to specify the combination of the execution subjects having the relatively short execution time from the combinations of the execution subjects with respect to each piece of selection target image processing; and a display configured to display the combination specified by the specification unit.

It may be preferable that the library includes a first image processing group that can be executed by the first control device and a second image processing group that can be executed by the second control device, a processing content of the second image processing group being identical to each pieces of image processing of the first image processing group.

It may be preferable that execution time information defining the execution time of each of the first control device and the plural pieces of image processing executed by the first control device and the second control device is also stored in the storage. The estimator calculates the execution time in each combination of the execution subjects based on the execution time information.

It may be preferable that the display displays the combination of the execution subjects specified by the specification unit in parallel with each item representing each piece of selection target image processing.

It may be preferable that the display also displays a processing time when the combination of the execution subjects specified by the specification unit executes each piece of selection target image processing.

It may be preferable that the image processing system further includes an optimizer configured to optimize the execution order of each piece of selection target image processing while the combination of the execution subjects specified by the specification unit is maintained.

According to another aspect, an information processing device configured to be communicable with an information processing device including a first control device and a second control device having a type different from the first control device, the information processing device includes: a storage in which a library including plural pieces of image processing executed by the first control device or the second control device is stored; an operation unit configured to receive an operation to select at least one piece of image processing from the library and an operation to designate execution order with respect to each piece of selection target image processing selected through the selection operation; an estimator configured to estimate a processing time in each combination of execution subjects with respect to each piece of selection target image processing when the first control device or the second control device executes each piece of selection target image processing according to the execution order; a specification unit configured to specify the combination of the execution subjects having the relatively short processing time from the combinations of the execution subjects; and a display configured to display the combination specified by the specification unit.

According to still another aspect, an information processing method includes the steps of: preparing a library including plural pieces of image processing executed by a first control device or a second control device having a type different from the first control device; receiving an operation to select at least one piece of image processing from the library and an operation to designate execution order with respect to each piece of selection target image processing selected through the selection operation; estimating an execution time in each combination of execution subjects with respect to each piece of selection target image processing when the first control device or the second control device processes each piece of selection target image processing according to the execution order; specifying the combination of the execution subjects having the relatively short execution time from the combinations of the execution subjects with respect to each piece of selection target image processing; and displaying the combination specified by the specification step.

According to yet another aspect, an information processing method includes the steps of: preparing a library including plural pieces of image processing executed by a first control device or a second control device having a type different from the first control device; receiving an operation to select at least one piece of image processing from the library and an operation to designate execution order with respect to each piece of selection target image processing selected through the selection operation; estimating an execution time in each combination of execution subjects with respect to each piece of selection target image processing when the first control device or the second control device processes each piece of selection target image processing according to the execution order; specifying the combination of the execution subjects having the relatively short execution time from the combinations of the execution subjects with respect to each piece of selection target image processing; and displaying the combination specified by the specification step.

In a certain aspect, the optimum execution subject can be specified with respect to each piece of image processing in the user setting processing flow.

These and other objects, features, aspects and advantages of the present disclosure will become apparent from the following detailed description of the invention, taken in conjunction with the accompanying drawings.

DETAILED DESCRIPTION

Hereinafter, exemplary embodiments will be described with reference to the drawings. In the following description, the same component or constituent is designated by the same reference symbol. The same component or constituent has the same name and function. Accordingly, the overlapping description of the same component or constituent will be omitted. The following embodiments and modifications may selectively be combined as appropriate.

First Embodiment

[A. Outline]

Figure 1:
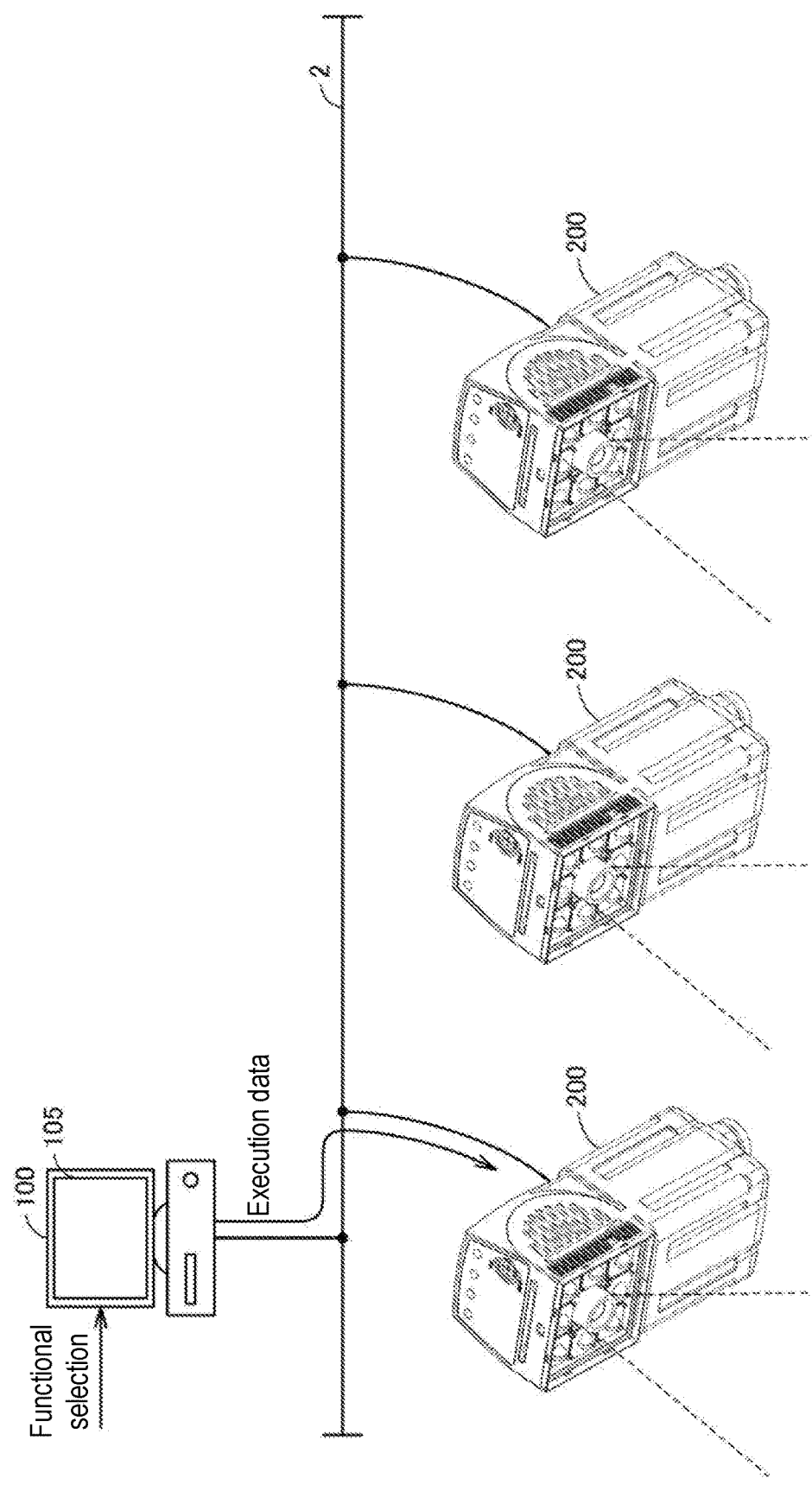
FIG. 1 is a view illustrating an example of a system configuration of an image processing system according to a first embodiment.

An outline of an image processing system 1 according to a first embodiment will be described with reference to FIGS. 1 to 3. FIG. 1 is a view illustrating an example of a system configuration of the image processing system 1 according to a first embodiment. Typically the image processing system 1 is incorporated in a production line. The image processing system 1 performs processing (hereinafter, referred to as "measurement processing") such as character recognition and a flaw inspection based on an image obtained by imaging an inspection target workpiece conveyed on the production line.

In the example of FIG. 1, the image processing system 1 includes a management device 100 that is of an example of the information processing device and at least one image processing device 200 configured to be communicable with the management device 100. For example, the workpiece is conveyed in a predetermined direction by a conveyance mechanism such as a belt conveyer, and each image processing device 200 is disposed at a predetermined position relative to the conveyance path.

The image processing device 200 includes an imager, a storage device in which a library including plural functional modules for implementing an image processing function is stored, and a processor that executes at least one functional module (typically, a program module) to process the image obtained from the imager. Each functional module includes a command code or an execution module implementing some sort of image processing function in the image processing device 200. A user can perform various pieces of measurement processing by any combination of pieces of image processing included in the library. The image processing device 200 performs the measurement processing in conjunction with plural types of control devices such as a CPU and an FPGA, which allows a processing time to be shortened.

A process of setting the processing flow for performing desired measurement processing will be described with reference to FIG. 2. FIG. 2 is a conceptual view schematically illustrating an example of a process in which the user sets the processing flow.

In step S1, a list of a library 110 including plural pieces of image processing is displayed on a display of the management device 100. The user operates an operation unit such as a keyboard and a mouse to perform an operation to select at least one piece of image processing from the library 110 and an operation to designate the execution order for each piece of selection target image processing selected by the selection operation. For example, the execution order of the image processing is designated by an alignment sequence of the pieces of selection target image processing.

Figure 2:
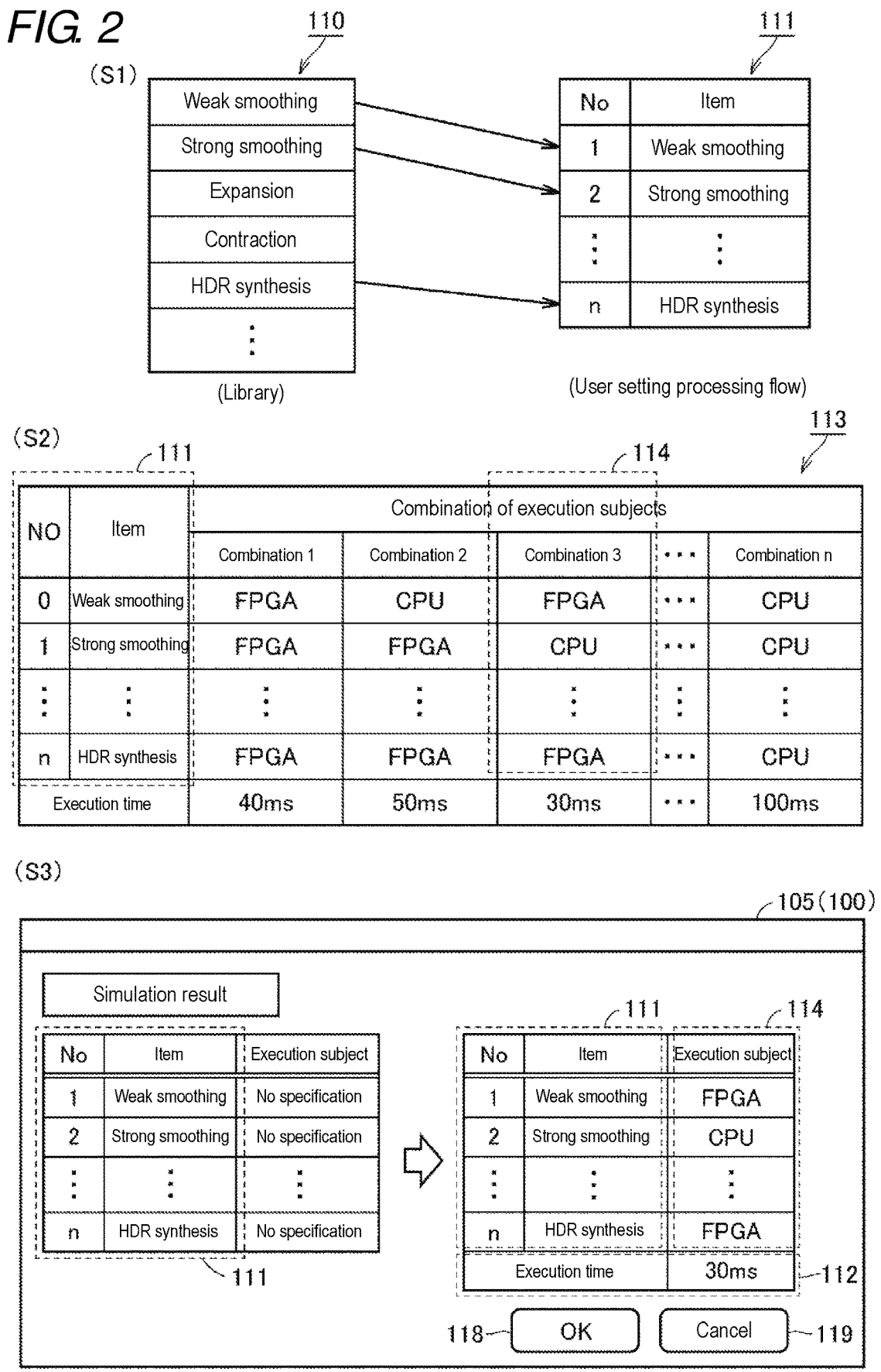
FIG. 2 is a conceptual view schematically illustrating an example of a process in which a user sets a processing flow.
Figure 3A:
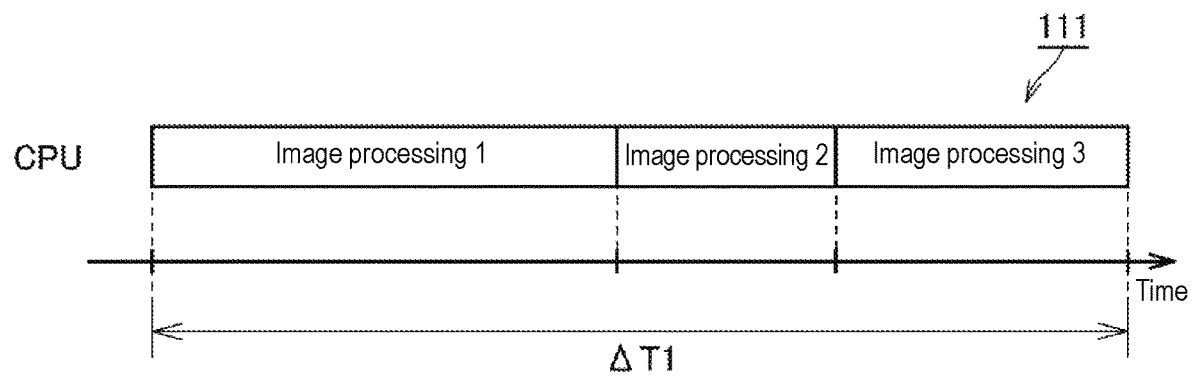
FIG. 3A, FIG. 3B, and FIG. 3C are views each illustrating an execution time of a processing flow.
Figure 3B:
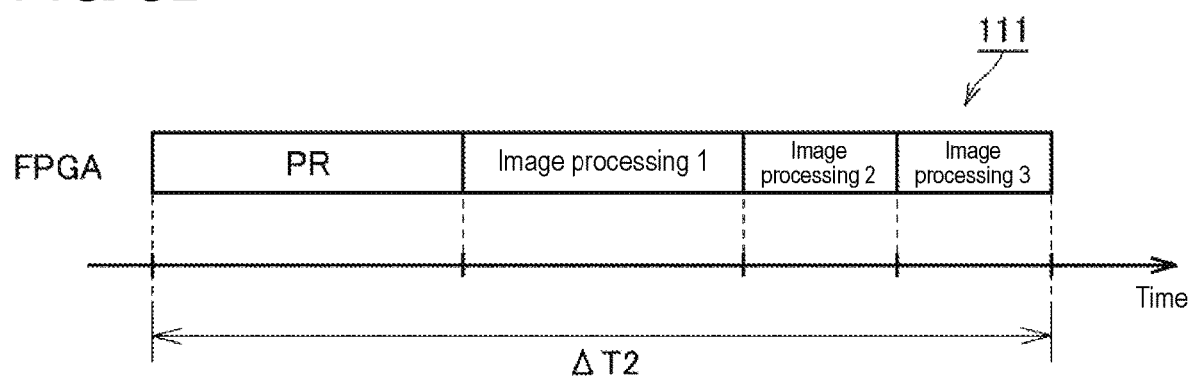
Figure 3C:
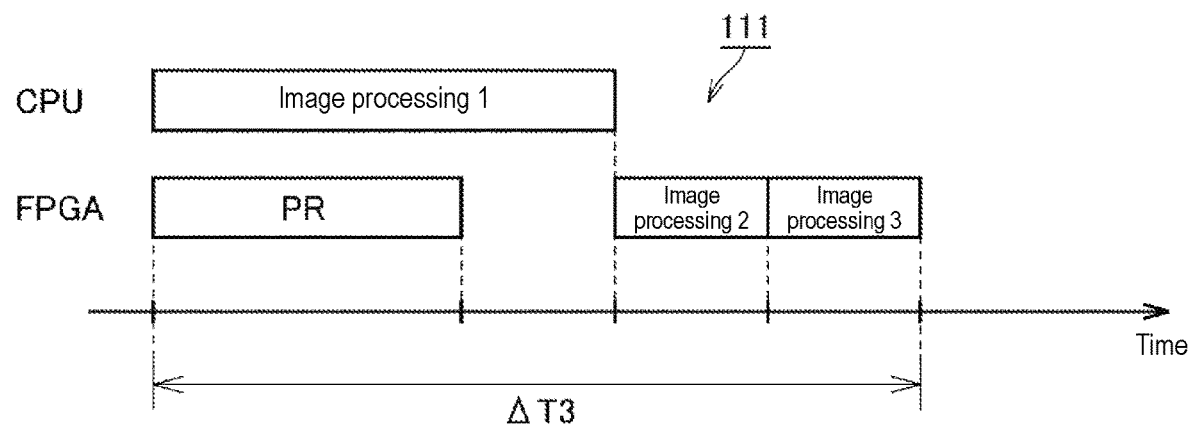

In the example of FIG. 2, a processing flow 111 is set by an image processing group selected from the library 110. FIG. 3A, FIG. 3B, and FIG. 3C illustrate an execution time of the processing flow 111.

As illustrated in FIG. 3A, the execution time becomes ΔT1 in the case that the processing flow 111 is executed only by the CPU of the image processing device 200. As illustrated in FIG. 3B, the execution time becomes ΔT2 in the case that the processing flow 111 is executed only by the FPGA of the image processing device 200. As illustrated in FIG. 3C, the execution time becomes ΔT3 (ΔT3<ΔT1, ΔT2) in the case that the processing flow 111 is cooperatively executed by the CPU and FPGA of the image processing device 200.

Typically a processing speed of the FPGA is faster than a processing speed of the CPU. However, some of the FPGAs have a function (what is called partial reconfiguration (PR)) of dynamically reconfiguring a circuit configuration during the execution of the processing. A circuit scale of the FPGA can be virtually expanded by the appropriate reconfiguration of the circuit of the FPGA. However, when the FPGA is frequently reconfigured, time necessary for the reconfiguration is lengthened, and the execution time of the processing flow 111 may occasionally become longer than expected. Each piece of image processing set by the user is cooperatively executed by the CPU and the FPGA, whereby shortening the execution time of the processing flow 111.

The optimum execution subject that executes each piece of image processing included in the processing flow 111 varies depending on various factors such as the combination of the pieces of image processing and the execution order of the pieces of image processing. Therefore, the image processing system 1 according to a first embodiment estimates the execution time of the processing flow 111 in each combination of the execution subject with respect to each piece of image processing included in the processing flow 111, and specifies an optimum combination of the execution subjects based on an estimation result.

More specifically, in step S2, the management device 100 estimates the execution time in each combination of the execution subjects of the CPU (first control device) or the FPGA (second control device) for piece of image processing included in the processing flow 111 when the CPU or the FPGA executes each piece of image processing included in the processing flow 111 according to the designated execution order. A method for estimating the execution time will be described later.

Then, the management device 100 specifies the combination in which the estimated execution time is relatively short from the combinations of the execution subjects. As an example, the management device 100 specifies the combination in which the execution time becomes the shortest from the combinations of the execution subjects. In an estimation result 113 of FIG. 2, a combination 114 is specified as the optimum combination of the execution subjects.

In step S3, the management device 100 displays the optimum combination 114 of the execution subjects specified in step S2 on a display 105. At this point, the display 105 displays the combination 114 of execution subjects in parallel with each piece of image processing of the processing flow 111. When the optimum execution subject is displayed in parallel with the image processing, the user easily recognizes the execution subject of each piece of image processing.

The display 105 also displays an execution time 112 when the optimum combination 114 of the execution subjects executes the processing flow 111. Therefore, the user can visually recognize an effect when the execution subject of the processing flow is optimized.

When the user presses an OK button 118, the management device 100 reflects the optimization result of the execution subject, and then ends the processing. When the user presses a cancel button 119, the management device 100 ends the processing without reflecting the optimization result of the execution subject.

In the above description, the CPU and the FPGA are cited as an example of the control device of the image processing device 200. However, the control device of the image processing device 200 is not limited to the CPU and the FPGA. For example, the control device of the image processing device 200 may be another piece of hardware such as a digital signal processor (DSP) and a graphics processing unit (GPU).

In the above description, by way of example, the image processing device 200 is constructed with the two types of control devices (that is, the CPU and the FPGA). However, the image processing device 200 is constructed with at least three types of control devices.

In the above description, by way of example, the execution time 112 is displayed on the display 105. However, another piece of information may be displayed on the display 105. For example, the display 105 may display the number of times of circuit reconfiguration generated in the FPGA of the image processing device 200 when the combination 114 of the execution subjects executes the processing flow 111. In the management device 100, the number of times of circuit reconfiguration increases with increasing number of FPGAs set for the processing flow 111. As an example, the management device 100 subtracts the number of FPGAs set for the processing flow 111 from a predetermined value, thereby calculating the number of times of circuit reconfiguration. The predetermined value corresponds to the number of set FPGAs in which the reconfiguration of the FPGA is generated.

The display 105 may display an FPGA remaining amount representing a free resource of the FPGA. In the management device 100, the FPGA remaining amount decreases with increasing number of FPGAs set for the processing flow 111. As an example, the management device 100 subtracts the number of FPGAs set for the processing flow 111 from a predetermined value, thereby calculating the FPGA remaining amount. The predetermined value corresponds to the number of set FPGAs in which the reconfiguration of the FPGA is generated. When the calculated FPGA remaining amount is less than zero, the FPGA remaining amount is set to zero. Alternatively, the FPGA remaining amount is decremented by a predetermined number (for example, 1) every time the FPGA is set for the processing flow 111, and the FPGA remaining amount is refreshed to the predetermined value every time the FPGA remaining amount is less than zero.

Preferably the number of times of circuit reconfiguration and the FPGA remaining amount, which are displayed on the display 105, are updated in conjunction with the operation to designate the execution subject. That is, the number of times of circuit reconfiguration and the FPGA remaining amount are updated every time the designation of the execution subject is changed. Therefore, the user easily determines whether the designated combination of the execution subjects is good.

[B. Whole System Configuration]

Figure 4:
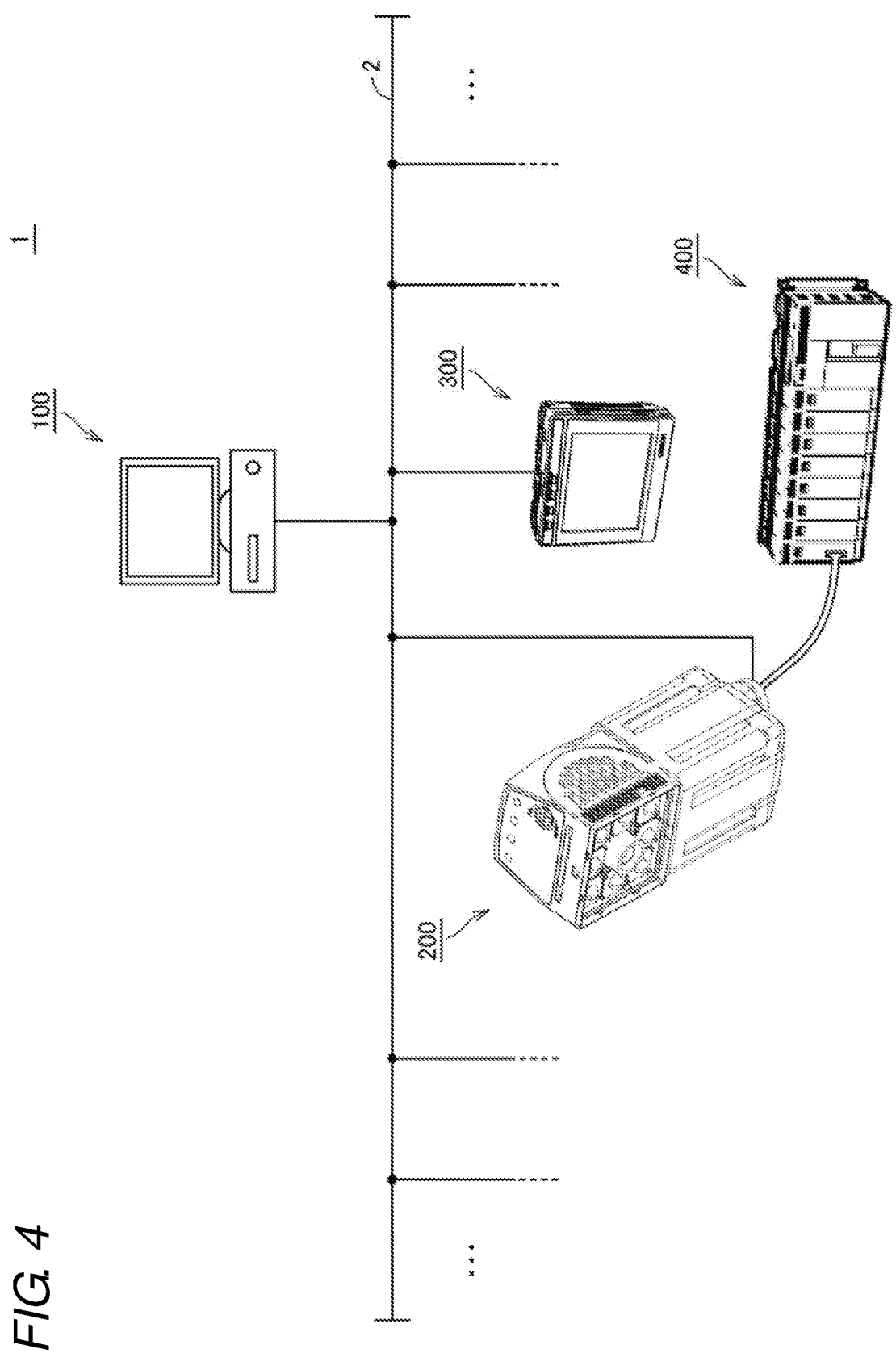
FIG. 4 is a schematic diagram illustrating a whole configuration of an image processing system of a first embodiment.

A whole configuration of the image processing system 1 will be described below. FIG. 4 is a schematic diagram illustrating the whole configuration of the image processing system 1. Referring to FIG. 4, the image processing system 1 includes a management device 100 and at least one image processing device 200 and at least one display setting unit 300, which are connected to the management device 100 through a network 2. A programmable logic controller (PLC) 400 is connected to the image processing device 200.

For example, the display setting unit 300 displays setting of a parameter of the image processing executed on the image processing device 200 and an inspection result obtained by the execution of the image processing in the image processing device 200.

The PLC 400 exchanges a timing signals and result information with the image processing device 200. The PLC 400 can also perform whole control of the image processing system 1 by receiving a signal from another device or transmitting a signal to another device.

The PLC 400 may be connected to the image processing device 200 through the network 2, and the display setting unit 300 may directly be connected to the image processing device 200.

In the image processing system 1 of FIG. 4, in response to a trigger signal from the PLC 400, each of the image processing devices 200 takes an image of a subject existing in a view field range, and processes the obtained image, thereby executing the measurement processing. The measurement processing may be repeated at a predetermined period, or executed in an event manner in response to the trigger signal from the PLC 400. The image processing executed by the image processing device 200 can appropriately be replaced as described above. Therefore, as illustrated in FIG. 1, when the plural image processing devices 200 are disposed in the same production line, each image processing device 200 may perform different image processing on the same inspection target, and output the measurement result.

[C. Functional Configuration of Management Device 100]

Figure 5:
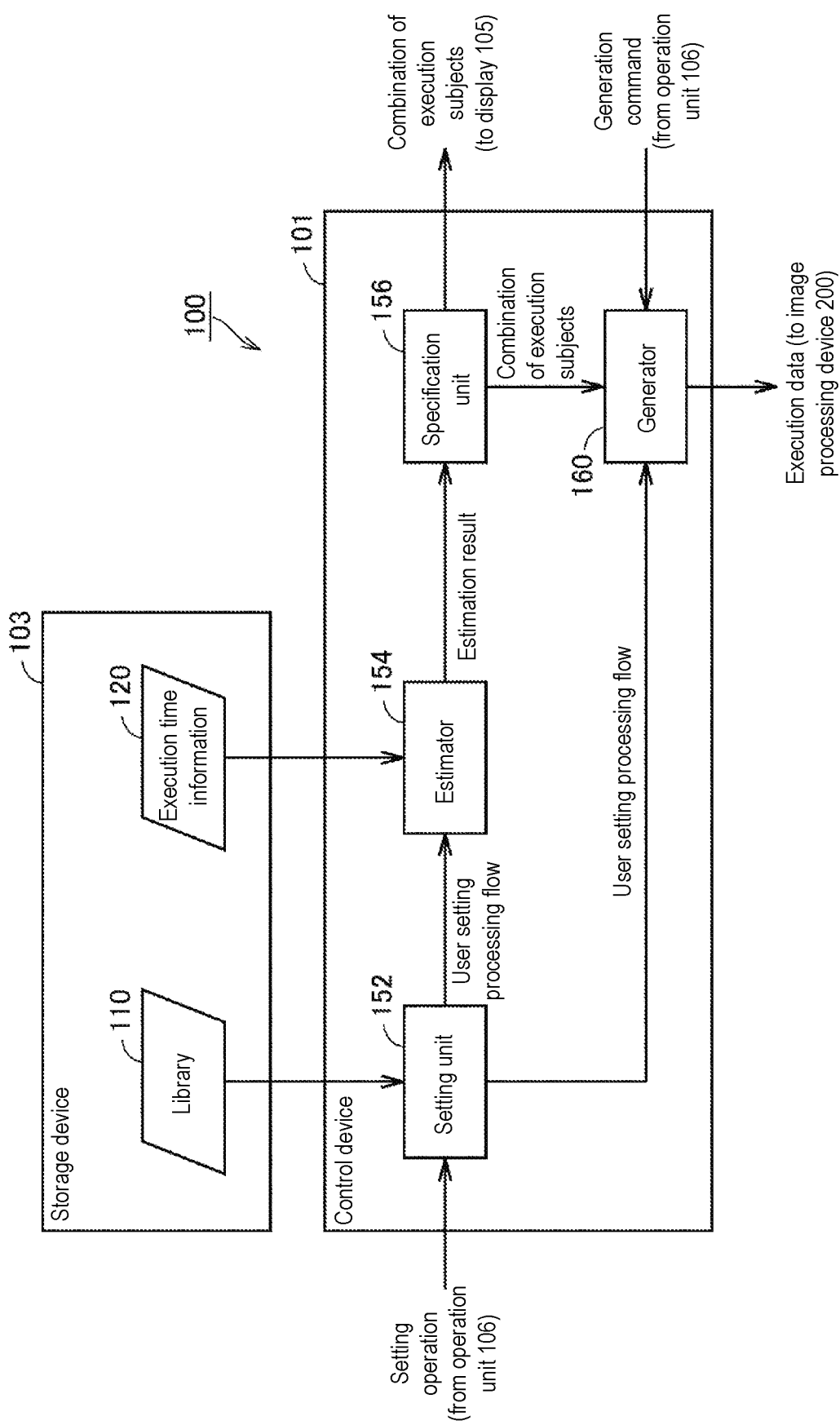
FIG. 5 is a view illustrating an example of a functional configuration of a management device of a first embodiment.

A function of the management device 100 will be described with reference to FIGS. 5 to 9. FIG. 5 is a view illustrating an example of a functional configuration of the management device 100.

As illustrated in FIG. 5, the management device 100 includes a control device 101 and a storage device 103 as a main hardware configuration. The control device 101 includes a setting unit 152, an estimator 154, a specification unit 156, and a generator 160 as a functional configuration. These functional configurations will be described below in order.

(C1. Setting Unit 152)

Figure 6:
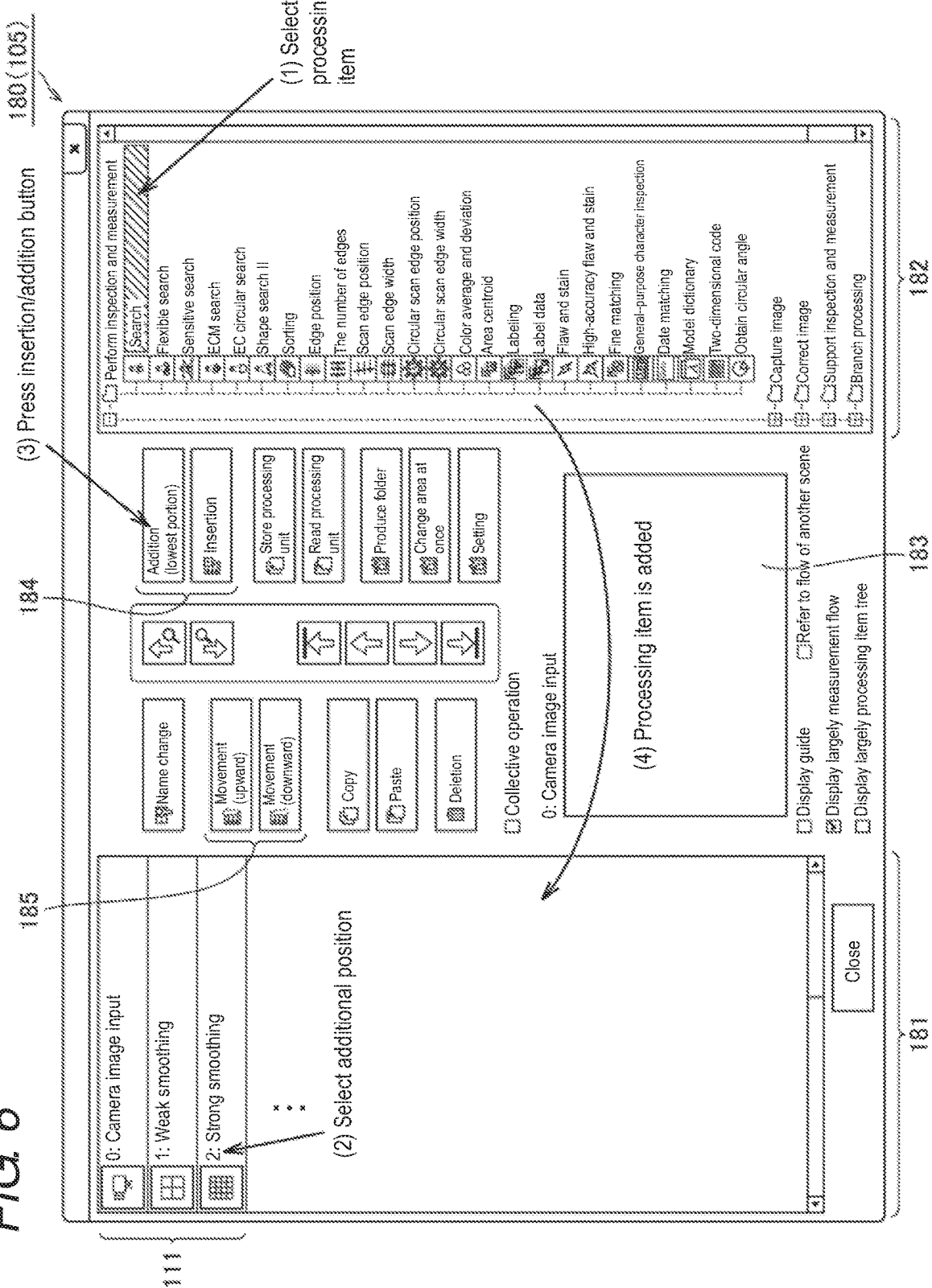
FIG. 6 is a view illustrating a user interface provided by a setting unit.

The setting unit 152 provides a user interface that receives an operation to select at least one piece of image processing from a previously-prepared library including plural pieces of image processing and an operation to designate the execution order with respect to each piece of selection target image processing selected by the selection operation. FIG. 6 is a view illustrating a user interface 180 provided by the setting unit 152.

For example, the user interface 180 is displayed on the display 105 of the management device 100. The user interface 180 includes a set item display area 181, a processing item selection area 182, a camera image display area 183, a processing item insertion/addition button 184, and an execution order switching button 185. A content of a currently-set processing setting is graphically displayed in the set item display area 181. A list of icons indicating a selectable processing item is displayed together with their names in the processing item selection area 182.

In the processing item selection area 182 of the user interface 180, the user selects a processing item necessary for the target image processing ((1) the processing item is selected), and selects a position (order) to which the processing item selected in the set item display area 181 should be added ((2) additional position). When the user selects the processing item insertion/addition button 184 ((3) the insertion/addition button is pressed), the processing item is added ((4) the processing item is added). The content of the processing setting after the addition of the processing item is reflected in the set item display area 181.

By appropriate repetition of the processing, the user produces the processing flow performing the target measurement processing. The user selects the processing item in the set item display area 181, and selects the execution order using the execution order switching button 185 during or after the production of the processing setting, which allows the user to change the execution order as appropriate.

Figure 7:
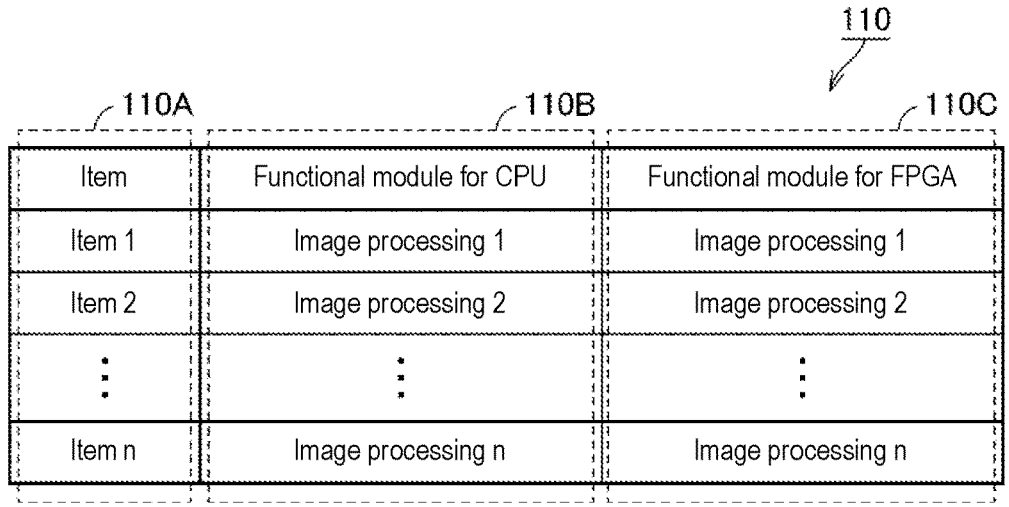
FIG. 7 is a view illustrating an example of a data structure of a library.

The setting unit 152 displays the image processing included in the library 110 in the processing item selection area 182 as a selectable processing item. The library 110 will be described with reference to FIG. 7. FIG. 7 is a view illustrating an example of a data structure of the library 110.

As illustrated in FIG. 7, the library 110 includes an item group 110A identifying each piece of image processing, an image processing group 110B (first image processing group) that can be executed by the CPU of the image processing device 200, and an image processing group 110C (second image processing group) that can be executed by the FPGA of the image processing device 200. The image processing group 110B and the image processing group 110C have the same processing content. As used herein, "the same processing content" means processing in which a result obtained from predetermined input becomes identical or substantially identical. Because the same or the substantially same image processing is prepared for each of the CPU and the FPGA, each piece of image processing included in the library 110 can be executed by either the CPU or the FPGA.

For example, the image processing groups 110B, 110C are function modules (typically, a program module). Each functional module includes a command code or an execution module, which implements the image processing.

(C2. Estimator 154)

Figure 8:
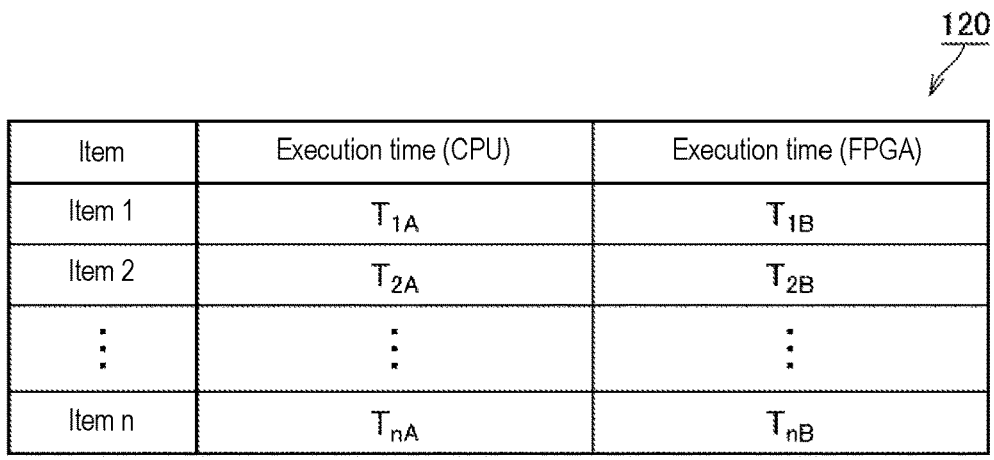
FIG. 8 is a view illustrating an example of a data structure of execution time information.

Referring to FIG. 5 again, in the case that the user setting processing flow 111 is processed by the CPU or the FPGA according to the set execution order, the estimator 154 estimates the execution time in each piece of image processing included in the processing flow 111 in each combination of execution subjects. For example, the execution time is estimated based on execution time information 120 in FIG. 8. FIG. 8 is a view illustrating an example of the data structure of execution time information 120.

As illustrated in FIG. 8, the execution time information 120 defines the execution time of each piece of image processing defined in the library 110 (see FIG. 7) in each type of control device of the image processing device 200. The execution time of each piece of image processing by the CPU and the execution time of each piece of image processing by the FPGA are defined in the example of FIG. 8. Each execution time defined in the execution time information 120 is previously obtained by an experiment or a simulation.

The estimator 154 specifies an item group corresponding to each piece of image processing included in the user setting processing flow 111 from the item groups defined in the execution time information 120. Then, the estimator 154 integrates the execution time correlated with the specified item group in each combination of execution subjects. The calculated execution time is output to the specification unit 156. The execution time of each piece of image processing is previously defined in each type of the execution subject, so that the estimator 154 can estimate the execution time of the processing flow 111 without executing the processing flow 111. Therefore, the execution time necessary for the estimation processing is shortened.

In the above description, by way of example, the execution time of the processing flow 111 is estimated based on the execution time information 120. However, the execution time may be estimated by another method. As an example, the estimator 154 may actually measure the execution time of the processing flow 111 by executing each piece of image processing included in the processing flow 111 in each combination of the execution subjects. Therefore, the execution time of the processing flow 111 is measured more accurately.

(C3. Specification Unit 156)

Referring to FIG. 5 again, the specification unit 156 specifies the combination in which the execution time of the processing flow 111 becomes relatively short from the combinations of the execution subjects. That is, the specification unit 156 specifies the relatively short execution time from the execution times estimated by the estimator 154, and specifies the combination of the execution subjects obtaining the specified execution time.

Typically the specification unit 156 specifies the combination in which the execution time of the processing flow 111 becomes the shortest from the combinations of the execution subjects. The combination of the execution subjects specified by the specification unit 156 is output to the generator 160.

The specification unit 156 may specify the predetermined number of combinations having the shorter execution time of the processing flow 111 from the combinations of the execution subjects. Alternatively, the specification unit 156 may specify the combination of the execution subjects in which the execution time of the processing flow 111 becomes shorter than it is now from the combinations of the execution subjects. In the case that plural combinations of the execution subjects are specified, the plural combinations of the execution subjects are displayed on the display 105 of the management device 100. The user selects the desired combination from the displayed combinations of the execution subjects. The management device 100 reflects the selected combination as the optimization result of the execution subject.

(C4. Generator 160)

Figure 9:
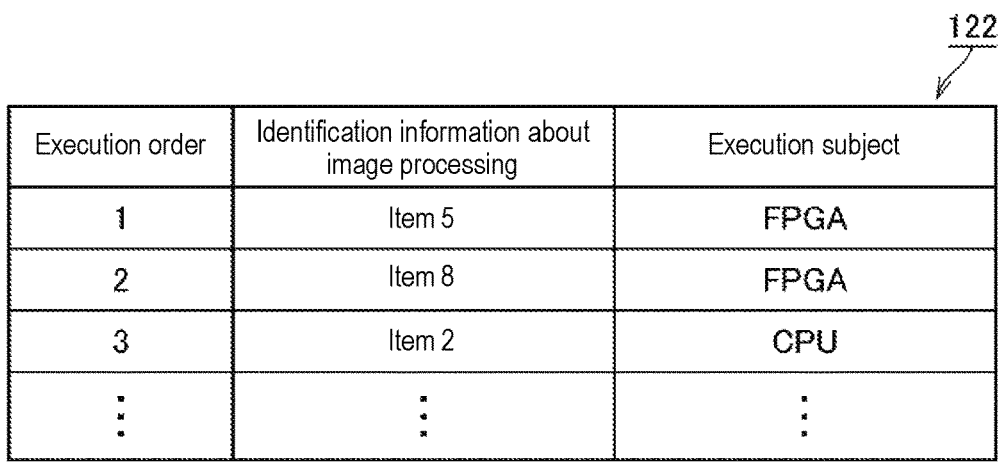
FIG. 9 is a view illustrating an example of a data structure of execution data.

The generator 160 generates execution data 122 in FIG. 9. FIG. 9 is a view illustrating an example of the data structure of the execution data 122.

The execution data 122 defines the execution order of each piece of image processing included in the processing flow 111, identification information (such as an item name and an image processing ID) about each piece of image processing, and the execution subject of each piece of image processing. The execution data 122 generated by the generator 160 is transmitted to the designated image processing device 200.

Upon receiving the execution data 122 from the management device 100, the image processing device 200 stores the execution data 122. The image processing device 200 refers to the stored execution data 122 based on the reception of an instruction to execute the measurement processing, and executes the processing flow 111 with the combination of the execution subjects defined in the execution data 122. More specifically, the image processing device 200 previously stores a whole or a part of the library installed in the management device 100, and sequentially reads the necessary functional module from the library according to the identification information about the image processing defined in the execution data 122 and the execution order. At this point, the image processing device 200 sequentially switches the execution subjects of the functional modules according to the combination of the execution subjects defined in the execution data 122.

[D. Control Structure of Image Processing System 1]

A control structure of the image processing system 1 will be described with reference to FIGS. 10 and 11.

Figure 10:
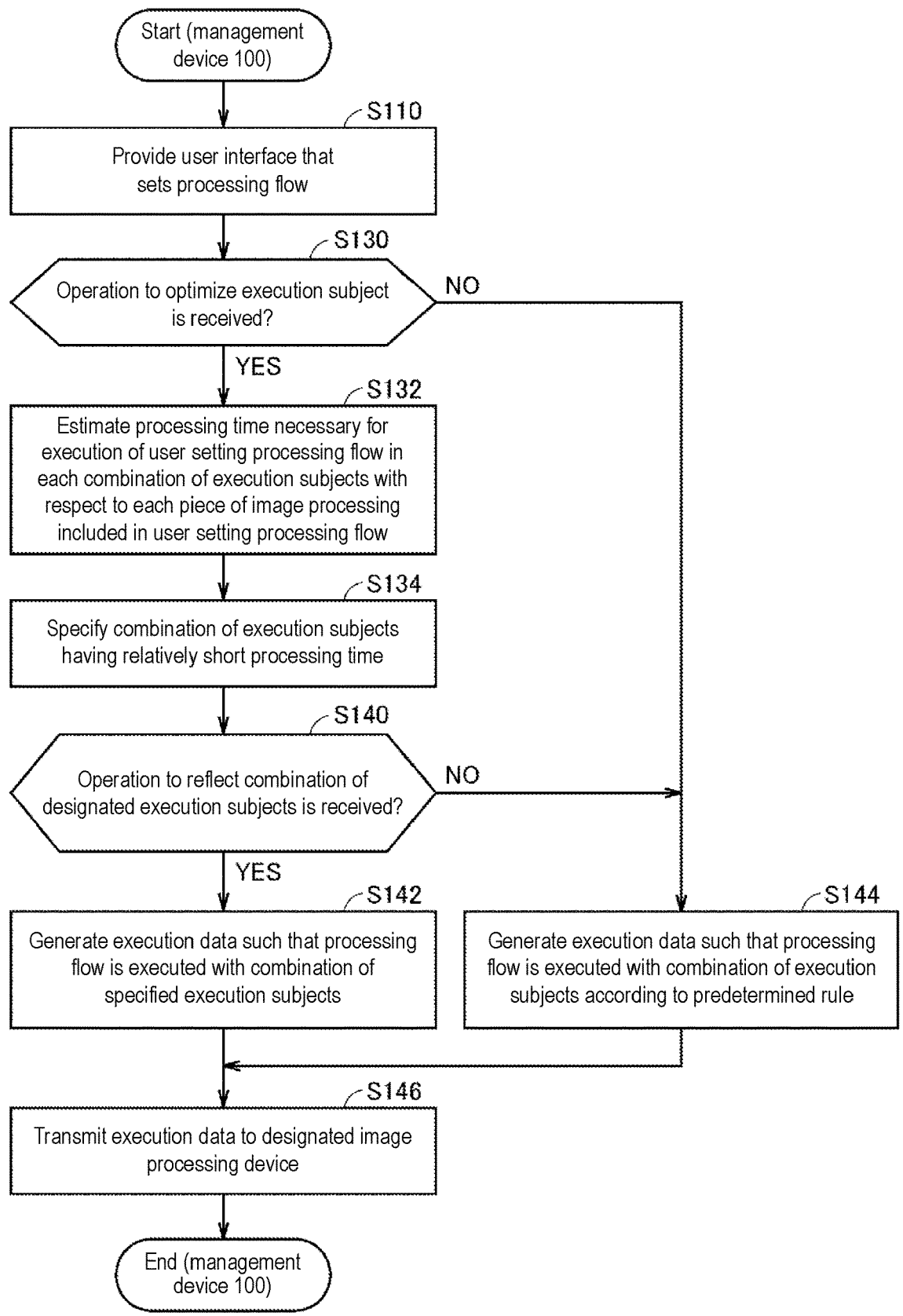
FIG. 10 is a flowchart illustrating a part of processing executed by a management device of a first embodiment.

FIG. 10 is a flowchart illustrating a part of processing executed by the management device 100. The control device 101 (see FIG. 5) of the management device 100 executes a program, thereby performing the processing in FIG. 10. In another aspect, a part or a whole of the processing may be executed by a circuit element or another piece of hardware.

Figure 11:
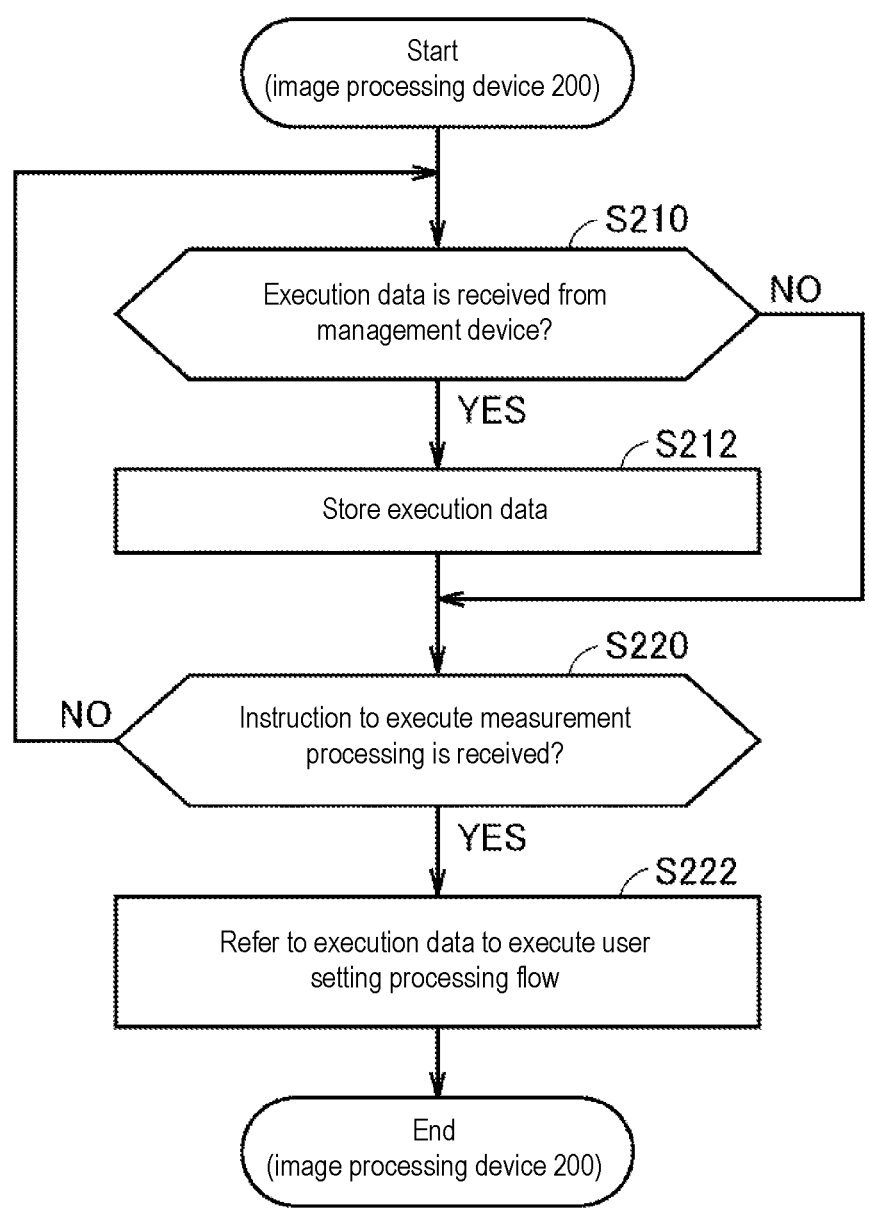
FIG. 11 is a flowchart illustrating a part of processing executed by an image processing device of a first embodiment.

FIG. 11 is a flowchart illustrating a part of processing executed by the image processing device 200. A control device 220 (see FIG. 13) of the image processing device 200 executes a program, thereby performing the processing in FIG. 11. In another aspect, a part or a whole of the processing may be executed by a circuit element or another piece of hardware.

The processing flows in FIGS. 10 and 11 will be described below in order.

(D1. Control Structure of Management Device 100)

In step S110, the control device 101 provides the user interface 180 (see FIG. 6) as the setting unit 152 (see FIG. 5) in order to set the processing flow. The user interface 180 receives an operation to select at least one piece of image processing and an operation to designate the execution order with respect to each piece of selection target image processing selected by the selection operation. An operation unit 106 to be described below (see FIG. 12) receives these operations. Any processing flow is set by the repetition of the operation to select the image processing and the operation to designate the execution order.

In step S130, the control device 101 determines whether an operation to optimize the execution subject is received with respect to the user setting processing flow. For example, the operation to optimize the execution subject is performed by a press of a predetermined button for switching to an optimization mode on the user interface 180. When determining that the operation is received (YES in step S130), the control device 101 switches the control to step S132. Otherwise (NO in step S130), the control device 101 switches the control to step S144.

In step S132, the control device 101 estimates the execution time in combination of the execution subjects of the CPU and FPGA when the CPU or FPGA of the image processing device 200 executes the user setting processing flow as the estimator 154 (see FIG. 5). Because the estimation method is described above with reference to FIG. 8, the overlapping description will be omitted.

In step S134, the control device 101 specifies the combination of the execution subjects in which the execution time estimated in step S132 becomes relatively short from the combinations of the execution subjects with respect to each piece of image processing of the processing flow as the specification unit 156 (see FIG. 5).

In step S140, the control device 101 determines whether an operation to reflect the combination of the execution subjects specified in step S134 is received. For example, the operation to reflect the combination of the execution subjects is received by the press of the OK button 118 in FIG. 2. When determining that the operation to reflect the combination of the execution subjects specified in step S134 is received (YES in step S140), the control device 101 switches the control to step S142. Otherwise (NO in step S140), the control device 101 switches the control to step S144.

In step S142, the control device 101 generates the execution data 122 (see FIG. 9) as the generator 160 (see FIG. 5) such that the user setting processing flow is executed with the combination of the execution subjects specified in step S134.

In step S144, the control device 101 decides the combination of execution subjects of the user setting processing flow according to a predetermined rule, and generates the execution data 122 such that the user setting processing flow is executed with the combination of the execution subjects. In step S146, the control device 101 transmits the execution data 122 to a designated image processing device 200.

(D2. Control Structure of Image Processing Device 200)

A control structure of the image processing device 200 will be described below with reference to FIG. 11.

In step S210, the control device 220 determines whether the execution data 122 (see FIG. 9) is received from the management device 100. When determining that the execution data 122 is received from the management device 100 (YES in step S210), the control device 220 switches the control to step S212. Otherwise (NO in step S210), the control device 220 switches the control to step S220.

In step S212, the control device 220 stores the execution data 122 received from the management device 100 in step S210 in a storage device 222 (see FIG. 13) of the image processing device 200.

In step S220, the control device 220 determines whether the instruction to execute the measurement processing is received. The instruction is issued in timing the imager of the image processing device 200 executes processing of imaging the workpiece. When determining that the instruction to execute the measurement processing is received (YES in step S220), the control device 220 switches the control to step S222. Otherwise (NO in step S220), the control device 220 returns the control to step S210.

In step S222, the control device 220 refers to the execution data 122 stored in step S212, and executes the processing flow 111 with the combination of execution subjects defined in the execution data 122. More specifically, the control device 220 previously stores a whole or a part of the library installed in the management device 100, and sequentially reads the necessary functional module from the library according to the identification information about the image processing defined in the execution data 122 and the execution order. At this point, the control device 220 sequentially switches the execution subjects of the functional modules according to the combination of the execution subjects defined in the execution data 122.

[E. Device Configuration of Image Processing System 1]

Figure 12:
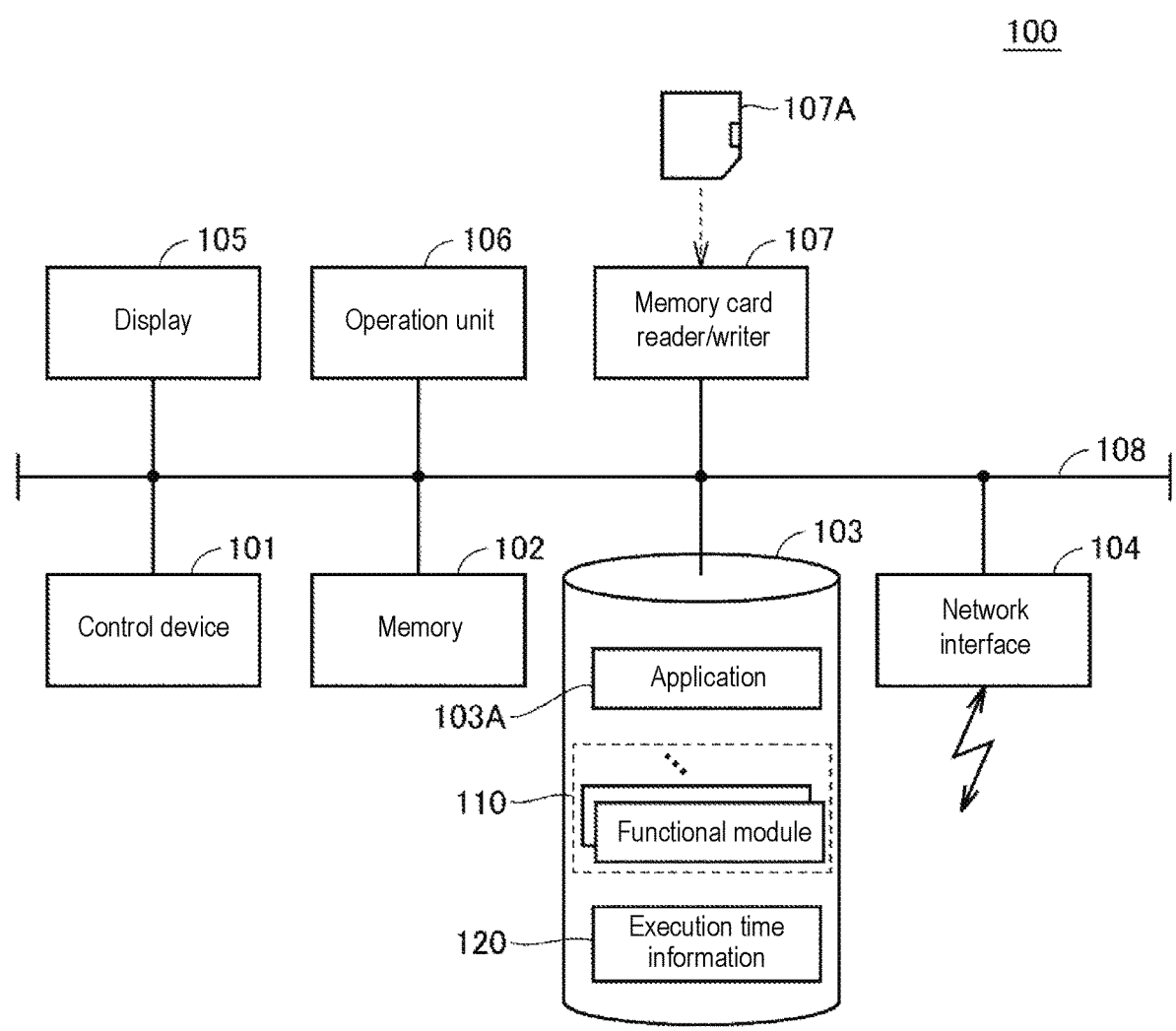
FIG. 12 is a block diagram illustrating a main hardware configuration of a management device of a first embodiment.
Figure 13:
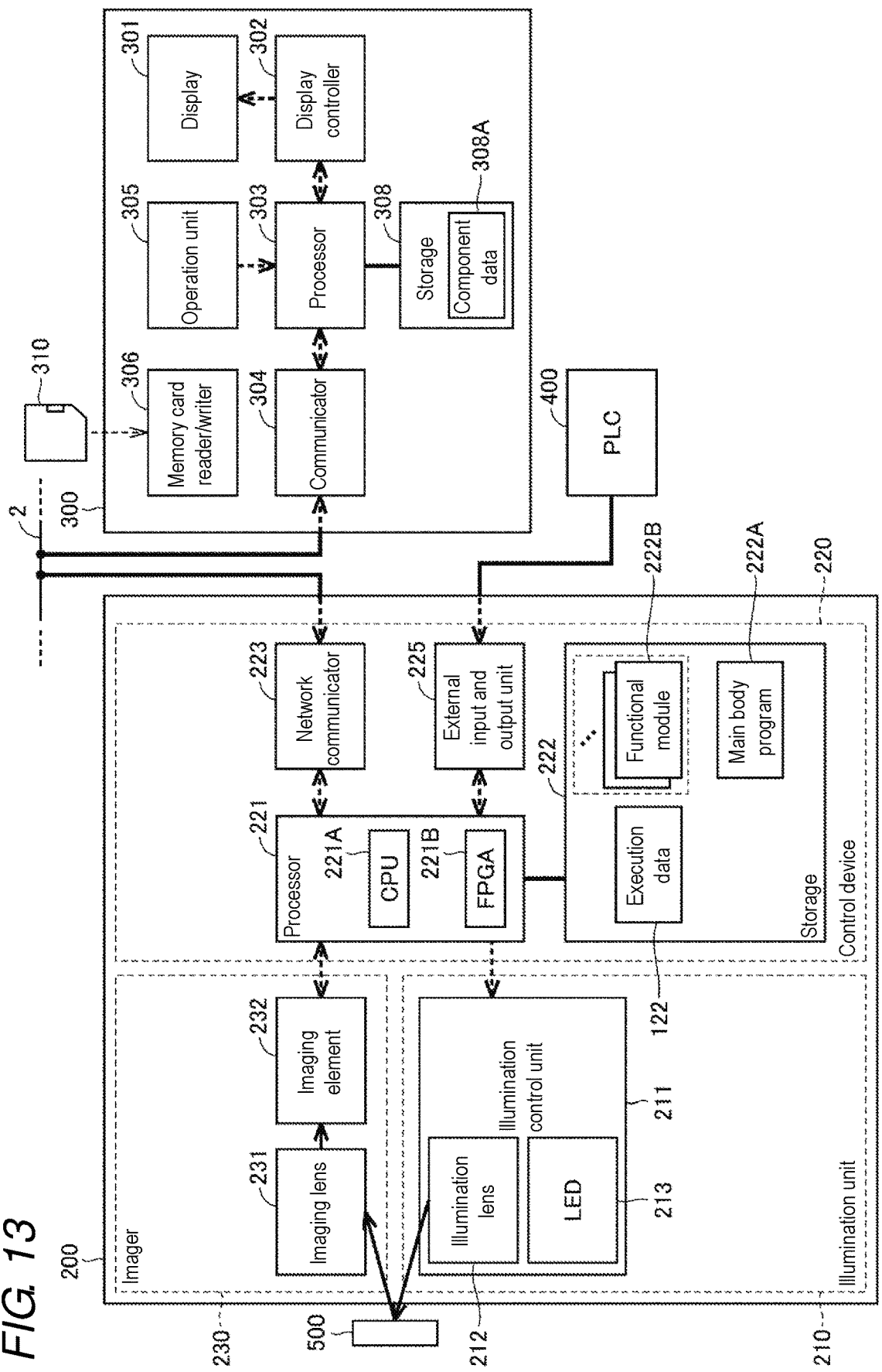
FIG. 13 is a block diagram illustrating main hardware configurations of an image processing device and a display setting unit of a first embodiment.

A configuration of each device constituting the image processing system 1 will be described with reference to FIGS. 12 and 13. FIG. 12 is a block diagram illustrating a main hardware configuration of the management device 100. FIG. 13 is a block diagram illustrating main hardware configurations of the image processing device 200 and display setting unit 300.

(E1. Management Device 100)

For example, the management device 100 is constructed with a general-purpose computer. A computer constructing the management device 100 includes a control device 101, a memory 102, a storage device 103 such as a hard disk drive (HDD), a network interface (I/F) 104, a display 105, an operation unit 106, and a memory card reader/writer 107. These units are communicably connected to one another through an internal bus 108.

The control device 101 implements the above various functions by the expansion of the program (instruction code) stored in the storage device 103 in the memory 102. The memory 102 and the storage device 103 store data in a volatile manner and a nonvolatile manner, respectively. In addition to an operating system (OS), the storage device 103 retains an application 103A, the library 110 (see FIG. 7), and the execution time information 120 (see FIG. 8).

The application 103A is a basic program that provides the user interface 180 (see FIG. 6). A whole or a part of the library 110 is transmitted to the image processing device 200 in response to a user's operation. That is, a library 222B (see FIG. 13) stored in the storage device 222 of the image processing device 200 is at least a subset of the library 110 stored in the storage device 103 of the management device 100.

The network interface 104 exchanges data between the management device 100 and the image processing device 200 through the network 2 (see FIG. 1).

The display 105 displays a setting operation screen (for example, the user interface 180) that is performed when the control device 101 executes the application 103A. The display 105 is constructed with a display such as a liquid crystal display (LCD).

The operation unit 106 receives the user's operation, and outputs an internal command indicating the received operation to the control device 101. Typically the operation unit 106 is constructed with a keyboard, a mouse, a touch panel, a tablet, a voice recognition device, and the like.

The memory card reader/writer 107 reads the data from the memory card 107A, and writes the data in the memory card 107A. A known recording medium such as a secure digital (SD) card can be used as the memory card 107A.

(E2. Image Processing Device 200)

A device configuration of the image processing device 200 will be described below with reference to FIG. 13. The image processing device 200 includes an illumination unit 210, a control device 220, and an imager 230.

The illumination unit 210 irradiates an inspection target workpiece 500 with light necessary for the imaging. That is, the illumination unit 210 irradiates an imaging range of the imager 230 with light. More specifically, the illumination unit 210 includes plural illumination control units 211 provided on an illumination board. The illumination control units 211 are disposed on the illumination board. Each of the illumination control units 211 includes an illumination lens 212 and an LED 213. The illumination control unit 211 irradiates the workpiece 500 with the light in response to a command from the control device 220. More specifically, the LED 213 emits the light to the workpiece 500 through the illumination lens 212.

The imager 230 receives the light reflected from the workpiece 500 irradiated with the light by the illumination unit 210, and outputs an image signal. The image signal is transmitted to the control device 220. More specifically, the imager 230 includes an imaging device 232 that is partitioned into plural pixels such as a coupled charged device (CCD) and a complementary metal oxide semiconductor (CMOS) image sensor in addition to an optical system such as the imaging lens 231.

The control device 220 controls the whole of the image processing device 200. That is, the control device 220 controls the illumination unit 210 and the imager 230, and executes the image processing based on the image signal from the imager 230. More specifically, the control device 220 includes a processor 221, a storage device 222, a network communicator 223, and an external input and output unit 225.

The processor 221 is constructed with an integrated circuit such as a CPU 121A and an FPGA 121B. Alternatively, the processor 221 may be constructed with a DSP, a GPU, an application specific integrated circuit (ASIC), or other integrated circuits.

The storage device 222 includes a nonvolatile storage device such as a read only memory (ROM), a flash memory, an HDD, and a static silicon disk (SSD) and/or a nonvolatile memory such as a random access memory (RAM). Typically, the processor 221 performs various kinds of image processing by executing a program (command code) and a module, which are stored in the storage device 222.

The program (command code) and the module are stored in the nonvolatile memory of the storage device 222, and the program read from the nonvolatile memory, workpiece data necessary for the execution of the program, the image data obtained by the imager 230, and the data indicating the measurement result are stored in the volatile memory of the storage device 222.

More specifically, the storage device 222 includes a main body program 222A and a library 222B including various functional modules (image processing).

The main body program 222A is a basic program implementing the basic operation of the image processing device 200, and can include the OS and a basic application. The library 222B is constructed with plural programs (typically, the command code and/or the library) implementing the image processing function provided by the image processing device 200. The libraries 222B as many as the number of image processing functions executable by the image processing device 200 are installed. As described above, the library 222B is at least a subset of the library 110 stored in the storage device 103 of the management device 100.

The network communicator 223 is an interface that exchanges the data with the management device 100 and a display setting unit 300 through the network 2. More specifically, a configuration pursuant to Ethernet (registered trademark) is adopted as the network communicator 223. The external input and output unit 225 is an interface that exchanges various pieces of data (input data and/or output data) with the PLC 400.

(E3. Display Setting Unit 300)

Referring to FIG. 13, the display setting unit 300 includes a display 301, a display controller 302, a processor 303, a communicator 304, an operation unit 305, a memory card reader/writer 306, and a storage device 308.

The display 301 displays a screen setting a parameter of the image processing executed on the connected image processing device 200 and a screen indicating an inspection result obtained by the execution of the image processing by the image processing device 200. Typically the display 301 is constructed with a display such as a liquid crystal display (LCD). The display controller 302 executes processing of displaying an image on the display 301 in response to an instruction from the processor 303.

The processor 303 executes processing of generating an image to be displayed on the display 301 in response to an instruction/command from the image processing device 200, replies to user input through the operation unit 305, and transmits an input value to the image processing device 200.

The storage device 308 includes a nonvolatile storage device such as a ROM, a flash memory, an HDD, and an SSD and/or a nonvolatile memory such as a RAM. The storage device 308 stores an object used in screen display as component data 308A. The processor 303 uses the component data 308A to perform the screen display.

The communicator 304 is an interface that exchanges the data with the image processing device 200.

The operation unit 305 receives the user's operation, and outputs the internal command indicating the received operation to the processor 303. The operation unit 305 typically includes a touch panel (pressure sensor), a button, and a key, which are disposed on a surface of the display 301.

The memory card reader/writer 306 reads the data from a memory card 310, and writes the data in the memory card 310. A known recording medium such as an SD card can be used as the memory card 310.

[F. Summary of First Embodiment]

As described above, the management device 100 estimates the execution time, which is necessary for each piece of image processing included in the user setting processing flow when the CPU or FPGA of the image processing device 200 executes the image processing, in each combination of the execution subjects of the CPU and the FPGA. The management device 100 specifies the combination of the execution subjects in which the execution time of the processing flow becomes relatively short from the combinations of the execution subjects. Therefore, the management device 100 can specify the optimum execution subject with respect to each piece of image processing of the user setting processing flow.

Particularly, the optimization of the execution subject is advantageous under the environment where the processing flow is set by the user. That is, when a device such as a copying machine and a television set is specified, the optimum execution subject can be previously known, and there is no need to change the execution subject. However, the image processing system 1 of a first embodiment can provide the user the environment where the processing flow can be set, and set any processing flow to various image processing devices 200. Therefore, the optimum execution subject varies depending on the type of the image processing device 200 and the content of the set processing flow.

As an example, the optimum execution subject changes according to the size of the input image. Generally, when the input image has the small size, the processing speed of the CPU is faster than the processing speed of the FPGA. On the other hand, when the input image has the large size, the processing speed of the FPGA is faster than the processing speed of the CPU. Additionally, the optimum execution subject varies depending on the type of the input image (for example, a monochrome image and a color image) and a size of a filter applied to the input image. The management device 100 of a first embodiment can optimize the execution subject according to the set processing flow even if the processing flow is arbitrarily set. The optimization of the execution subject is particularly effective in mounting the FPGA having the circuit reconfiguration function together with another type of control device.

It is necessary to understand a characteristic of the execution subject in order to optimize the execution subject. Therefore, it is necessary for the user to have specialized knowledge. On the other hand, in the management device 100 of a first embodiment, because the execution subject is automatically optimized according to the user setting processing flow, the user can easily optimize the execution subject even if the user does not have the specialized knowledge.

Second Embodiment

[A. Outline]

The image processing system 1 of a first embodiment optimizes the execution subject of the user setting processing flow. On the other hand, an image processing system 1 according to a second embodiment optimizes not only the execution subject in the user setting processing flow, but also the execution order of each piece of image processing of the user setting processing flow.

Because the image processing system 1 of a second embodiment is identical to the image processing system 1 of the first embodiment in other points, the overlapping description will be omitted.

[B. Functional Configuration of Management Device 100]

Figure 14:
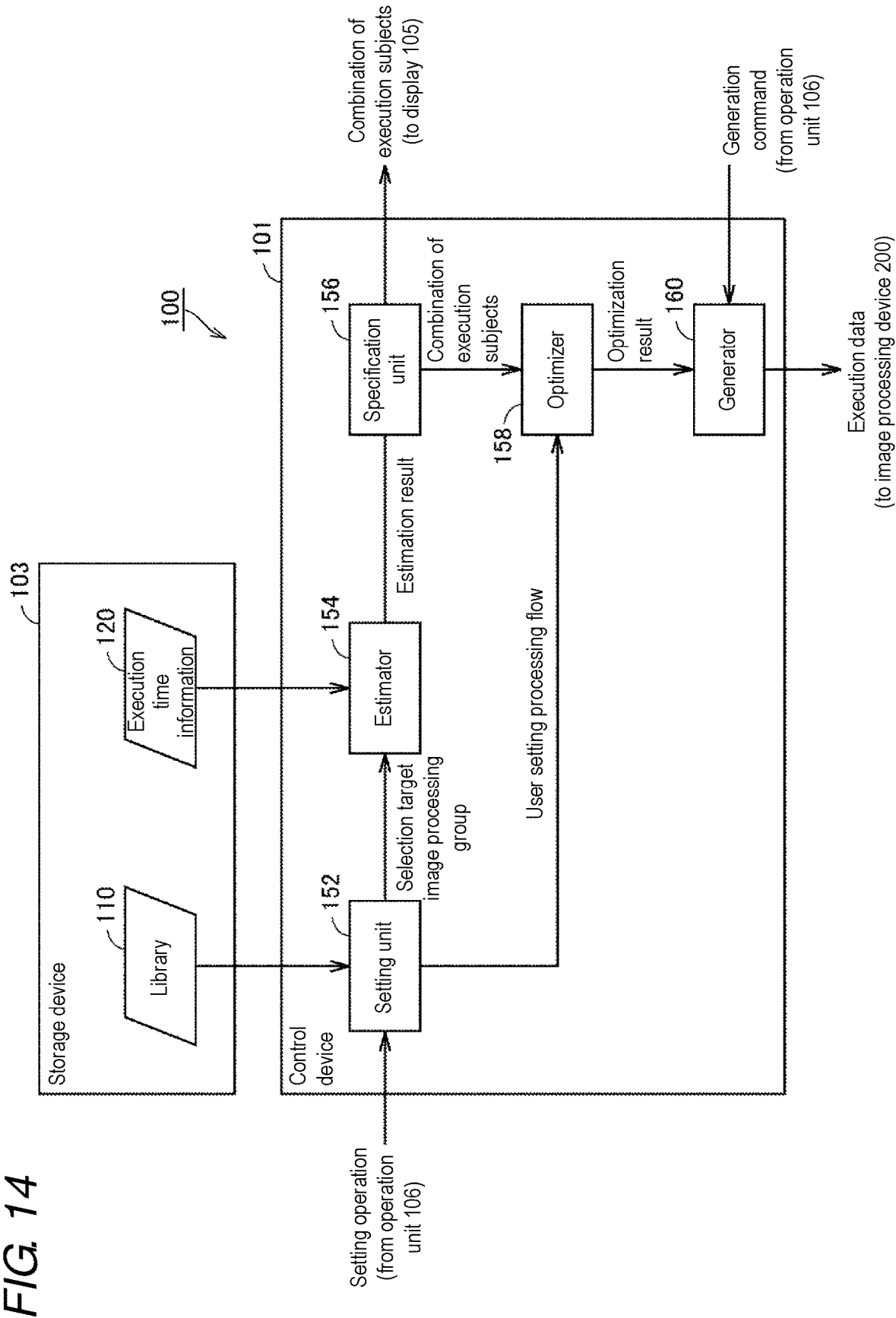
FIG. 14 is a view illustrating an example of a functional configuration of a management device according to a second embodiment.
Figure 15:
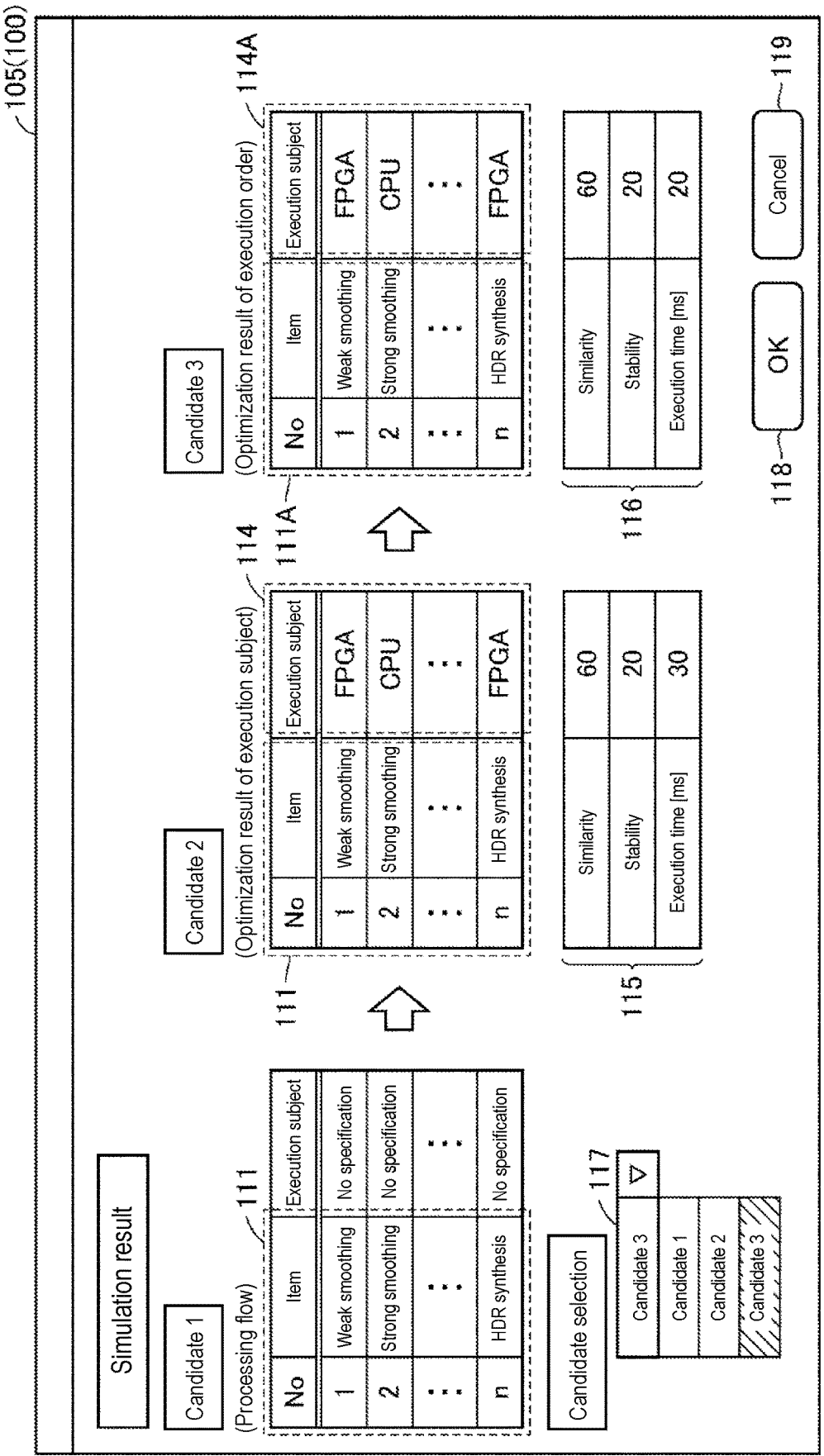
FIG. 15 is a view illustrating an example of a screen on which an optimization result of an execution subject and an optimization result of execution order are displayed.

A function of a management device 100 of a second embodiment will be described with reference to FIGS. 14 and 15. FIG. 14 is a view illustrating an example of a functional configuration of the management device 100 of a second embodiment.

As illustrated in FIG. 14, the management device 100 includes the control device 101 and the storage device 103 as a main hardware configuration. The control device 101 includes the setting unit 152, the estimator 154, the specification unit 156, an optimizer 158, and the generator 160 as a functional configuration.

Because the functional configurations except for the optimizer 158 are described above with reference to FIG. 5, the overlapping description will be omitted.

Sometimes the output result does not change even if the execution order of the image processing is switched. In such cases, the optimizer 158 optimizes the execution order of each piece of image processing included in the user setting processing flow such that the execution time is shortened. At this point, preferably the execution order of each piece of image processing is optimized while the combination of execution subjects specified by the specification unit 156 is maintained. Alternatively, the execution subject may be optimized again with respect to the optimized processing flow of the execution order.

As an example, the combination of the pieces of image processing in which the processing time can be shortened and the optimized execution order of the combination are previously defined. The optimizer 158 refers to the definition to specify the combination of the pieces of image processing in which the processing time can be shortened from the user setting processing flow, and optimizes the execution order of the user setting image processing according to the optimized execution order defined with respect to the combination. An optimization result is displayed on the display 105 of the management device 100.

An example of a screen on which the optimization result is displayed will be described with reference to FIG. 15. FIG. 15 is a view illustrating an example of the screen on which the optimization result of the execution subject and the optimization result of the execution order are displayed.

For example, the display 105 displays the user setting processing flow 111, a processing flow 111A after the optimization of the execution order, the combination 114 of the execution subjects of the processing flow 111, a combination 114A of the execution subjects of the processing flow 111A, an index 115 that determines whether the optimization result of the execution subject is good, an index 116 that determines whether the optimization result of the execution order is good, and a select box 117. In the example of FIG. 15, the combinations 114, 114A of the execution subjects are identical to each other.

The index 115 includes a similarity of the processing flow before and after the optimization of the execution subject, stability indicating a degree of change of the output result before and after the optimization of the execution subject, and the execution time after the optimization of the execution subject.

The index 116 includes the similarity of the processing flow before and after the optimization of the execution order, the stability indicating the degree of change of the output result before and after the optimization of the execution order, and the execution time after the optimization of the execution order.

The select box 117 receives an operation to select a specific candidate from optimization candidates of the execution subject and execution order. When the user presses the OK button 118 while selecting the specific candidate, the management device 100 writes the execution subject and the execution order, which are indicated by the selected candidate, in the execution data 122 (see FIG. 9). When the user presses the cancel button 119, the management device 100 ends the processing without reflecting the optimization results of the execution subject and execution order.

[C. Summary of Second Embodiment]

As described above, in a second embodiment, the management device 100 optimizes not only the execution subject of the user setting processing flow, but also the execution order of the image processing in the processing flow. The execution order is optimized such that the execution time is shortened. At this point, preferably the execution order is optimized while the combination of the execution subjects specified by the specification unit 156 is maintained. Therefore, the management device 100 can shorten the execution time of the user setting processing flow while the execution subject is optimized.

The disclosed embodiments should be construed as illustrative in all respects, not as restrictive. The scope of the present invention is indicated not by the above description but by the claims, and it is intended that the meanings equivalent to the claims and all the changes within the scope of the present invention are included in the scope of the present invention.

The invention claimed is:

1. An image processing system comprising:
   a first control device;
   a second control device having a type different from the first control device;
   a memory in which a library comprising a plurality of pieces of image processing executed by the first control device or the second control device is stored;
   a processor comprising:

an operation unit configured to receive an operation to select at least one piece of image processing from the library and an operation to designate an execution order to process each selected piece of image processing;

an estimator configured to estimate an execution time in each combination of execution subjects of the first control device and the second control device to process each selected piece of image processing by determining the execution time for each of the first control device and the second control device to process each selected piece of image processing according to the execution order;

a specification unit configured to specify a combination of the execution subjects having a shortest execution time from each of the combinations of the execution subjects to process each selected piece of image processing; and a display configured to display the combination of the execution subjects specified by the specification unit.

2. The image processing system according to claim 1, wherein
the library comprises:
a first image processing group to be executed by the first control device;
a second image processing group to be executed by the second control device, and
a processing content of the second image processing group is identical to each piece of image processing of the first image processing group.

3. The image processing system according to claim 1, wherein
execution time information defining the execution time of each of the first control device and the plurality of pieces of image processing executed by the first control device and the second control device and the plurality of pieces of image processing executed by the second control device are stored in the memory, and
the estimator is further configured to calculate the execution time in each combination of the execution subjects based on the execution time information.

4. The image processing system according to claim 1, wherein the display displays the combination of the execution subjects specified by the specification unit in parallel with each selected piece of image processing.

5. The image processing system according to claim 1, wherein the display displays a processing time in response to the combination of the execution subjects specified by the specification unit executing each selected piece of image processing.

6. The image processing system according to claim 1, wherein the processor further comprises an optimizer configured to optimize the execution order to process each selected piece of image processing while the combination of the execution subjects specified by the specification unit is maintained.

7. A first information processing device configured to be communicable with a second information processing device comprising a first control device and a second control device having a type different from the first control device, the first information processing device comprising:
a memory in which a library comprising a plurality of pieces of image processing executed by the first control device or the second control device is stored;
an operation unit configured to receive an operation to select at least one piece of image processing from the library and an operation to designate an execution order to process each selected piece of image processing;
a processor comprising:
an estimator configured to estimate an execution time in each combination of execution subjects of the first control device and the second control device to process each selected piece of image processing by determining the execution time for each of the first control device and the second control device to process each selected piece of image processing according to the execution order;
a specification unit configured to specify a combination of the execution subjects having a shortest execution time from each of the combinations of the execution subjects; and
a display configured to display the combination of the execution subjects specified by the specification unit.

8. An information processing method comprising:
preparing a library comprising a plurality of pieces of image processing executed by a first control device or a second control device having a type different from the first control device;
receiving an operation to select at least one piece of image processing from the library and an operation to designate an execution order to process each selected piece of image processing;
estimating an execution time in each combination of execution subjects of the first control device and the second control device to process each selected piece of image processing by determining the execution time for each of the first control device and the second control device to process each selected piece of image processing according to the execution order;
specifying a combination of the execution subjects having a shortest execution time from each of the combinations of the execution subjects to process each selected piece of image processing; and
displaying the combination of the execution subjects specified by the specifying.

9. A non-transitory computer-readable storage medium storing an information processing program executed by an information processing device, the information processing program causing the information processing device to perform operations comprising:
preparing a library comprising a plurality of pieces of image processing executed by a first control device or a second control device having a type different from the first control device;
receiving an operation to select at least one piece of image processing from the library and an operation to designate an execution order to process each selected piece of image processing;
estimating an execution time in each combination of execution subjects of the first control device and the second control device to process each selected piece of image processing by determining the execution time for each of the first control device and the second control device to process each selected piece of image processing according to the execution order;
specifying a combination of the execution subjects having a shortest execution time from each of the combinations of the execution subjects to process each selected piece of image processing; and
displaying the combination of the execution subjects specified by the specifying.

10. The image processing system according to claim 2, wherein execution time information defining the execution time of each of the first control device and the plurality of pieces of image processing executed by the first control device and the second control device and the plurality of pieces of image processing executed by the second control device are stored in the memory, and the estimator is further configured to calculate the execution time in each combination of the execution subjects based on the execution time information.

11. The image processing system according to claim 2, wherein the display displays the combination of the execution subjects specified by the specification unit in parallel with each selected piece of image processing.

12. The image processing system according to claim 3, wherein the display displays the combination of the execution subjects specified by the specification unit in parallel with each selected piece of image processing.

13. The image processing system according to claim 10, wherein the display displays the combination of the execution subjects specified by the specification unit in parallel with each selected piece of image processing.

* * * * *